L. G. WOOLLEY.
CHAMBER VESSELS.
No. 184,276. Patented Nov. 14, 1876.
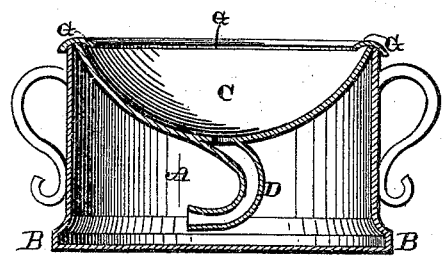
WITNESSES:
INVENTOR:

UNITED STATES PATENT OFFICE.

LEONIDAS G. WOOLLEY, OF MENDON, MICHIGAN, ASSIGNOR OF ONE-HALF HIS RIGHT TO L. COLE, OF SAME PLACE.

IMPROVEMENT IN CHAMBER-VESSELS.

Specification forming part of Letters Patent No. 184,276, dated November 14, 1876; application filed May 25, 1876.

*To all whom it may concern:*

Be it known that I, LEONIDAS G. WOOLLEY, of Mendon, in the county of St. Joseph and State of Michigan, have invented certain new and useful Improvements in Chamber-Vessels; and I do hereby declare the following to be a full, clear, and exact description of the invention, such as will enable others skilled in the art to which it pertains to make and use it, reference being had to the accompanying drawings, which form part of this specification.

My invention relates to an improvement in chamber-vessels; and it consists in the construction of a removable bowl or basin introduced therein, as will be hereinafter more fully set forth.

In the accompanying drawing, which fully illustrates my invention, A represents the vessel, constructed substantially of the form shown—that is to say, as large at the bottom as it is at the top, and with a projection at the bottom, all around, in the form of a rim, B, which prevents the liability of the vessel being so easily upset and contents spilled, as is often the case with the vessels as ordinarily constructed.

In the vessel A is introduced another vessel, C, in the shape of a shallow bowl or basin, which is provided with a bent or curved tube, D, extending to near the bottom of the vessel A.

The main object of my invention is to prevent the noise occasioned when children and females are using the chamber-vessel for urinating purposes, and this is fully accomplished by the introduction of the bowl or basin C, with tube D extending nearly to the bottom of the chamber.

The bowl or basin C is, around its edge, provided with a flange or rim, G, which extends beyond the bowl, both on the inner and outer sides, and said rim is concave on the under and convex on the upper side. The outwardly-projecting part of this rim rests upon the upper edge of the chamber $A_1$ and extends beyond the same, for supporting the bowl and holding it in proper position, and also to make its removal easy by hand without soiling or wetting the fingers. The inwardly-projecting portion of the flange or rim G prevents the urine from running upward on the side of the bowl and wetting the occupant. The flange or rim also prevents the spilling of the contents of the vessel A in case of an accidental or sudden concussion, and confines all unpleasant odor arising from the vessel.

Having thus fully described my invention, what I claim as new, and desire to secure by Letters Patent, is—

1. A removable bowl or basin, C, provided with a curved tube, D, at the bottom, in combination with a chamber-vessel, A, as set forth.

2. The bowl or basin C, provided with the flange or rim extending beyond the same, both on the outside and inside, for the purposes herein set forth.

The above specification of my invention signed by me this 15th day of May, 1876, in presence of two subscribing witnesses.

LEONIDAS G. WOOLLEY.

Witnesses:
    JOHN A. WALLACE,
    WM. McPHERSON.